United States Patent [19]  [11] Patent Number: 4,521,246
Ponghis et al.  [45] Date of Patent: Jun. 4, 1985

[54] OPERATING A BLAST FURNACE WITH THE INJECTION OF HOT REDUCING GASES

[75] Inventors: Nikolas G. Ponghis, Neuville-en-Condroz; Arthur G. Poos, Embourg, both of Belgium

[73] Assignee: Centre de Recherches Metallurgiques-Centrum voor Research in de Metallurgie, Brussels, Belgium

[21] Appl. No.: 529,656

[22] Filed: Sep. 6, 1983

Related U.S. Application Data

[63] Continuation of Ser. No. 356,792, Mar. 10, 1982, abandoned.

[30] Foreign Application Priority Data

Mar. 11, 1981 [BE] Belgium .................................. 887905

[51] Int. Cl.³ .................................................. C21B 5/06
[52] U.S. Cl. ........................................................ 75/42
[58] Field of Search ........................................ 75/41, 42

[56] References Cited

U.S. PATENT DOCUMENTS 3,460,934  8/1969  Kelmar ..................................... 75/41
3,764,300 10/1973  Wenzel et al. ........................... 75/42
4,072,502  2/1978  Santen et al. ............................ 75/11

OTHER PUBLICATIONS

Dean, E. R., *Blast Furnace and Steel Plant For May 1961*, pp. 417–422.

*Primary Examiner*—Melvyn J. Andrews
*Attorney, Agent, or Firm*—Holman & Stern

[57] ABSTRACT

Hot reducing gases, mainly containing CO, $H_2$, and optionally $N_2$, as well as smaller quantities of $H_2O$ and $CO_2$, are injected through some of the tuyeres. Hot air, hot superoxygenated air, recycled gas, or combustion vapor containing sufficient $CO_2$ is injected through the other tuyeres.

9 Claims, No Drawings

OPERATING A BLAST FURNACE WITH THE INJECTION OF HOT REDUCING GASES

This is a continuation of application Ser. No. 06/356,792, filed Mar. 10, 1982, now abandoned.

FIELD OF THE INVENTION

The present invention relates to an operating method for a blast furnace with the injection of hot reducing gases, in which only certain tuyeres are used for blasting the said gases.

DESCRIPTION OF THE PRIOR ART

We have already tested and advocated a method in which the hot air (generally called the hot blast) blasted through the main tuyeres of the blast furnace and burning, at the nozzles of the tuyeres, the coke which is heated during its descent into the blast furnace, is replaced by reducing gases of suitable composition heated to a temperature of between 1500° and 2800° C. in accordance with the desired grade of pig iron and the operating conditions of the blast furnace. In accordance with this method, the hot reducing gases are produced by reacting a fuel (solid, liquid, or gaseous) with a suitable oxidising agent, which may be hot air, superoxygenated air, recycled gases, or combustion vapour containing sufficient quantities of $CO_2$. These gases are heated to the required temperature in a reactor, preferably using electrical methods, for example of the arc heating or plasma torch type. This method enables the production, with suitable operating conditions for the apparatus, of pig iron having the required composition, whilst enabling the coke consumption to be fixed arbitrarily (provided that the coke rate does not go below 50 kg per metric ton (t) of pig iron). The above method has further advantages which are disclosed in Belgian Patent Specifications Nos. 748,274; 767,897; 770,094; and 813,118; in particular the advantage of enabling a very low coke consumption per tonne (metric ton) of molten metal produced.

However, research undertaken by the advocates of this method has shown that, in the present economic situation and despite certain environmental and other problems relating to the operation of a coking plant, it could be advantageous to use amounts of coke which are markedly greater than the minimum required for the application of the said method. This could be the case in a plant having an adequate coking capacity which is forced to produce a minimum quantity of coke in order to cover its rich gas requirements.

It is possible to cite, for example, a blast furnace run using the said method, in which the coke rate is fixed at 250 kg/t of pig iron. Even in this case, it is obvious that the said method as described above may be applied. It is simply necessary to adapt the composition and in particular the degree of oxidation of the gas (determined by its residual $H_2O$ and $CO_2$ contents) and its heating temperature to values which are compatible with the desired aims in accordance with an embodiment described in the method.

However, detailed examination of the operating conditions shows that, in this case, the temperature of the injected reducing gases is relatively high (approximately 2600° to 2800° C.) and that each of the tuyeres must be provided with a reactor for the production and heating of these reducing gases.

SUMMARY OF THE INVENTION

The present invention relates to a method which enables the same aims to be achieved in a different manner.

In accordance with the invention, the method described above is applied to a proportion of the tuyeres only (for example half the tuyeres) and by using a hot blast which is possibly processed (superoxygenated air), recycled gases, or combustion vapour containing sufficient quantities of $CO_2$, it is possible to halve (for example) the costs involved in the application of the prior method, since only half (for example) of the tuyeres must be provided with the required apparatus. The tuyeres operating in accordance with the said method may then be operated with reducing gases having fairly low residual $CO_2$ and $H_2O$ contents so as to burn with these gases a very low quantity of coke. In these conditions, the temperature of the injected gases is considerably lower and is, for example, approximately 2000° C., which obviously has a beneficial effect on the heat losses produced by these tuyeres and facilitates their cooling. In addition the quantity of coke desired is obtained by burning the coke with hot air, whether processed or not, injected through the tuyeres of the blast furnace which are not provided with equipment required for carrying out the said method.

DESCRIPTION OF THE PREFERRED EMBODIMENTS

Consequently, in the blast furnace operating method of the present invention hot reducing gases are injected through a certain number of main tuyeres, the said reducing gases mainly containing CO and $H_2$ and possibly $N_2$, and smaller quantities of $CO_2$ and $H_2O$, and hot air, possibly processed (superoxygenated air), recycled gas, or combustion vapour containing sufficient quantities of $CO_2$ is injected through the other tuyeres.

In certain cases it may be advantageous to increase the temperature of the flame obtained at the tuyeres as a result of the combustion of the coke with the hot air beyond the value which it is technically possible to achieve by superheating the air, by enriching the air with $O_2$ in order to obtain the same flame temperature at the reducing gas injection tuyeres and the convention hot air tuyeres.

Furthermore, it may be advantageous to modify the composition of the combustion gases obtained at the hot air tuyeres operating in the conventional manner by injecting nitrogen or preferably combustion vapour or even throat gas into the air. An injection of this type is preferably carried out in the hot air conduit upstream of the ring main distributing the hot blast to the tuyeres through which it is blasted. This method enables the same temperature and composition conditions for the combustion gases to be obtained for all the tuyeres supplies with this blast, whilst only requiring the construction of a single processing and regulating plant.

The Table given below shows the results of a run (Case A) with the injection of hot reducing gases through all the tuyeres (1036 Nm$^3$/t pig iron) and a run (Case B) with the injection of hot reducing gases through one half of the tuyeres (518 Nm$^3$/t pig iron) and hot air through the other half of the tuyeres (535 Nm$^3$/t pig iron). (Nm$^3$=cubic metres at normal temperature and pressure.)

The coke rate in run A is 169 kg/t pig iron and in run B is 315 kg/t pig iron.

TABLE

| | A | B |
|---|---|---|
| Coke | | |
| Coke rate (kg/t pig iron) | 169 | 315 |
| Throat gas | | |
| Temperature (°C.) | 109 | 120 |
| Reducing gases | | |
| $H_2O + CO_2$ (%) | 3.53 | 3.33 |
| $N_2$ (%) | 40 | 40 |
| Quantity ($Nm^3$/t pig iron) | 1036 | 518 |
| Temperature (°C.) | 2400 | 2400 |
| Blast (hot air) | | |
| Quantity ($Nm^3$/t pig iron) | — | 535 |
| Pig iron | | |
| Si (%) | 0.60 | 0.60 |
| Production rate (t/h) | 191 | 170 |
| Temperature (°C.) | 1410 | 1492 |

We claim:

1. A method of operating a blast furnace having a plurality of peripherally spaced tuyeres for feeding gaseous agents into said blast furnace, said tuyeres being located at one level, comprising dividing said plurality of tuyeres into a first group of tuyeres and a second group of tuyeres, injecting through said first group of tuyeres hot reducing gases having a temperature in the range of about 1500° C. to about 2800° C. and consisting essentially of CO and $H_2$ with small amounts of $CO_2$ and $H_2O$, and simultaneously injecting through said second group of tuyeres an oxidizing blast gas consisting essentially of hot air.

2. The method of claim 1, wherein said tuyeres are usual blast tuyeres of the blast furnace.

3. The method of claim 1 wherein the amount of ($CO_2 + H_2O$) in said hot reducing gases is less than 5%.

4. The method of claim 3 wherein said hot reducing gases contain nitrogen.

5. The method of claim 1 wherein the hot air is enriched with oxygen.

6. The method of claim 1 wherein the hot air is enriched with $CO_2$.

7. The method of claim 1 wherein each said group of tuyeres comprises half of total number of tuyeres.

8. The method as claimed in claim 1 in which the flame temperature obtained at the tuyeres as a result of combustion of coke with the hot air is increased beyond the value which it is technically possible to achieve by super heating of the air, by enriching this air with oxygen in order to obtain the same flame temperature at the reducing gas tuyeres and the hot air tuyeres.

9. The method as claimed in claim 1, further comprising injecting nitrogen or combustion vapour or top gas into the hot air before it is injected through said second group of tuyeres.

* * * * *